(12) United States Patent
Mao

(10) Patent No.: US 7,054,482 B2
(45) Date of Patent: May 30, 2006

(54) SMART MASKING TOOL FOR IMAGE PROCESSING

(75) Inventor: Kauxuan Mao, Fremont, CA (US)

(73) Assignee: Arcsoft, Inc., Fremont, CA (US)

( * ) Notice: Subject to any disclaimer, the term of this patent is extended or adjusted under 35 U.S.C. 154(b) by 875 days.

(21) Appl. No.: 09/968,430

(22) Filed: Sep. 28, 2001

(65) Prior Publication Data

US 2003/0063797 A1    Apr. 3, 2003

(51) Int. Cl.
*G06K 9/00* (2006.01)

(52) U.S. Cl. ..................... 382/162; 382/283

(58) Field of Classification Search ........ 382/162–167, 382/173, 190–199, 282–284, 181; 345/418, 345/421, 600, 629, 441, 606; 348/584–587, 348/590–592, 650, 578, 582, 599; 358/537–538, 358/540

See application file for complete search history.

(56) References Cited

U.S. PATENT DOCUMENTS

| | | | | |
|---|---|---|---|---|
| 5,852,673 A | * | 12/1998 | Young | ............. 382/164 |
| 6,288,703 B1 | * | 9/2001 | Berman et al. | ............. 345/600 |
| 6,721,446 B1 | * | 4/2004 | Wilensky et al. | ........... 382/162 |

* cited by examiner

*Primary Examiner*—Joseph Mancuso
*Assistant Examiner*—Ishrat Sherali
(74) *Attorney, Agent, or Firm*—David T. Millers

(57) ABSTRACT

Smart selection and paste operations for image processing use a wide edge area for selection and masking of an object from a source image. The wide edge area, which can be designated with a brush tool, allows a user to select all of a desired object without requiring pixel-by-pixel identification of the objects edge. A masking unit operates on the edge area and designates each portion or pixel of the edge area as being foreground, background, or a combination of foreground and background. The mask unit constructs a mask and a pixel map for the selected object. The mask is an array of blending parameters, and the pixel map contains natural foreground colors generated by removing background contributions form portions designated as combinations of foreground and background. A paste operation uses the blending parameters from the mask to add background contributions from a target images to the portions of the object designated as combinations of foreground and background.

7 Claims, 4 Drawing Sheets

SMART MASKING TOOL FOR IMAGE PROCESSING

REFERENCE TO COMPUTER PROGRAM LISTING

This patent document includes computer program listing appendix on a compact disc that includes a file entitled "ARC001US Appendix", having a size of 18.1 Kbytes and a creation date of Sep. 20, 2001. The material on the compact disc is hereby incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Image processing often involves combining portions of two or more images to construct a composite image. For example, a source image may include an object or a person that can be selected and moved into a target image to construct the composite image. The portion of the source image that is selected for moving is often referred to as a foreground object or foreground image.

One traditional method for combining images is blue screen matting. For blue screen matting, a foreground object is photographed in front of a blue or green background. The uniform color of the background simplifies identification of the foreground object so that an automated process can easily cut the foreground object from a source image for pasting in a target image. A drawback of blue screen matting is the requirement of a specially photographed source image.

For ordinary images, digital image processing systems have provided techniques that allow a user to select a portion of a source image as a foreground object. For example, FIGS. 1A, 1B, and 1C respectively illustrate examples of a source image containing a foreground object 110, a target image that provides a background 120, and a composite image constructed by pasting foreground object 110 into target image 120. For selection of foreground object 110 from the source image of FIG. 1A, conventional image processing software displays the source image and provides a selection tool that appears as a cursor in the displayed image. The user uses a mouse or other pointing device to move the cursor and trace the boundary of the portion of the source image that will become the foreground object. The boundary generally separates selected image pixels from unselected image pixels and mathematically has zero thickness, e.g., is between pixels.

The manual selection process can be complicated when the desired foreground object has an irregular shape that makes tracing the boundary of the object difficult. Accordingly, a user making a selection will often exclude from the selection a desired portion of the foreground object and include in the selection a portion of the background.

Additionally, portions of the desired foreground object may have color from the source image that results from a combination of the object's natural color and the color of the background in the source image. For example, a complex object such as an object with burred edges, hair, smoke, water, glass, and shadow typically has colors that depend on the background. Traditional select, cut, and paste processes do not work well for such objects because the selected foreground object when pasted on the target image has colors inherited from the background of the source image and those colors usually appear unnatural in the composite image.

Since many users desire simple methods for combining portions of separate images to form natural-looking composite images, better methods for selecting foreground objects and better methods for combining portions of source and target images are sought.

SUMMARY

In accordance with an aspect of the invention, a selection tool for an image processing system defines a boarder area, which is a band around an object being selected. Pixels in the boarder area have colors that can be from the foreground object, the background, or a combination of colors from the background and foreground. For each pixel in the boarder area, a masking process determines a natural foreground color for the pixel and a blending parameter indicating the extent to which the natural foreground color of the pixel mixes with the surrounding background color in the source image.

When pasting a selected foreground object into a target image, the color of each pixel results from combining the natural foreground color of the pixel with the background color from the target image. The relative contributions of the foreground and background colors depend on a blending parameter found from the source image during the masking process.

One specific embodiment of the invention is an image processing system or software package that includes a selection tool and a masking unit. The selection tool enables user selection of an edge area surrounding an object being selected, the edge area having a non-zero width. The masking unit operates on the edge area to designate each portion of or pixel in the edge area as being selected foreground, unselected background, or a combination of foreground and background. The image processing system may further implement a paste operation that uses the mask to determine whether portions of a pixel map representing the object are unused, replace corresponding portions in a target image, or are combined with corresponding portions of the target image.

Another embodiment of the invention is an image manipulation process that begins by designating an edge area for an object in a source image. The edge area has a non-zero width. The process then constructs a mask containing a data element for each portion of the edge area. Each data element indicates whether the corresponding portion of the edge area has a foreground color from the object, a background color from a background surrounding the object, or a combination color resulting from a combination of the foreground and background colors.

Each data element in the mask is typically a blending parameter. A first value for the blending parameter (e.g., 0) indicates the corresponding portion or pixel has the correct color for the foreground object. A second value for the blending parameter indicates the corresponding portion or pixel is part of the background surrounding the object, and a range of values for the blending parameter indicate proportions of the foreground color and the background color in a combination color.

When a portion of the edge area has a combination color, a natural foreground color that results from removing from the combination color a contribution associated with the background surrounding the object can be used in a pixel map representing the object. The pixel map thus contains pixel values representing the natural foreground color of corresponding portions of the object.

In accordance with another aspect of the invention, pasting the object in a second pixel map representing a target image includes: identifying a target pixel that corresponds to a source pixel in the object; and changing a first color of the target pixel to a new color determined from the first color, a second color associated with the source pixel, and a blending parameter associated with the source pixel. In particular, the new color can be a linear combination of the first and second colors.

BRIEF DESCRIPTION OF THE DRAWINGS

Use of the same reference symbols in different figures indicates similar or identical items.

DETAILED DESCRIPTION

In accordance with an aspect of the invention, a smart masking process for an image processing system creates a mask including an array of blending parameters. Each blending parameter indicates whether a corresponding pixel in a composite image should have the color of a corresponding pixel in a foreground object, the color of a corresponding pixel in a target image, or a combination of the colors of the corresponding pixels in the foreground object and the target image.

A process for generating the mask determines a natural foreground color and a blending parameter for each pixel in an edge area of a foreground object. A pixel map representing the foreground object contains pixel values that correspond to the determined natural foreground colors, and the mask for the foreground object contains the determined blending parameters.

Figure 1A:
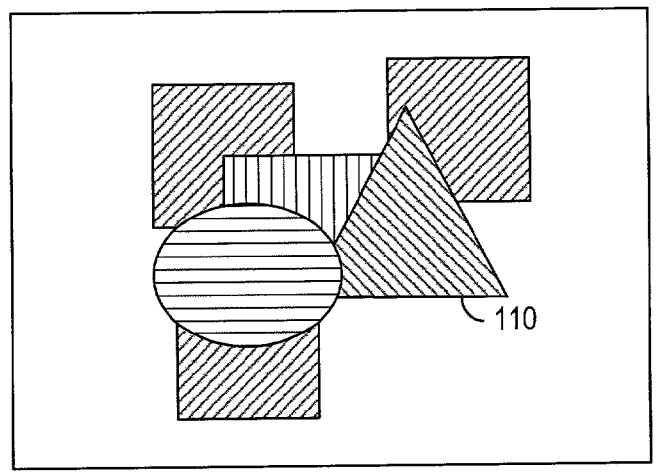
FIGS. 1A, 1B, and 1C respectively show examples of source, target, and composite images in a cut and paste operation.
Figure 1B:
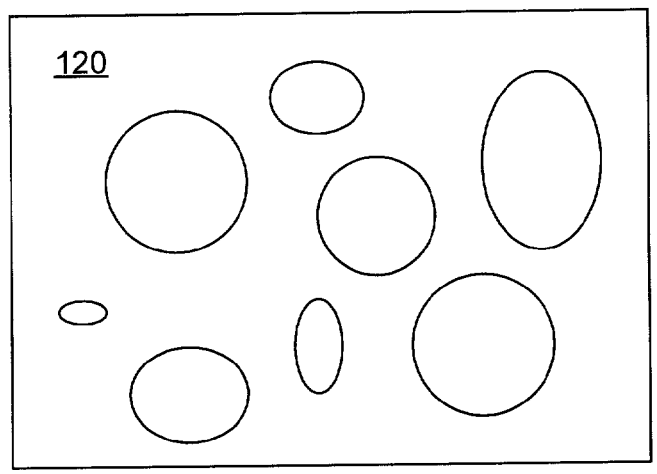
Figure 1C:
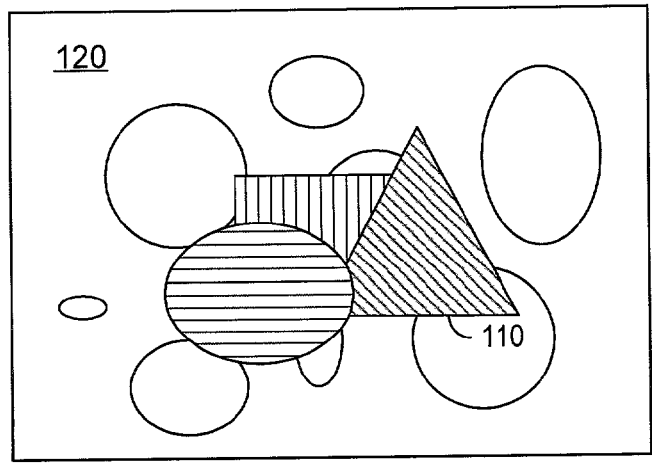
Figure 2A:
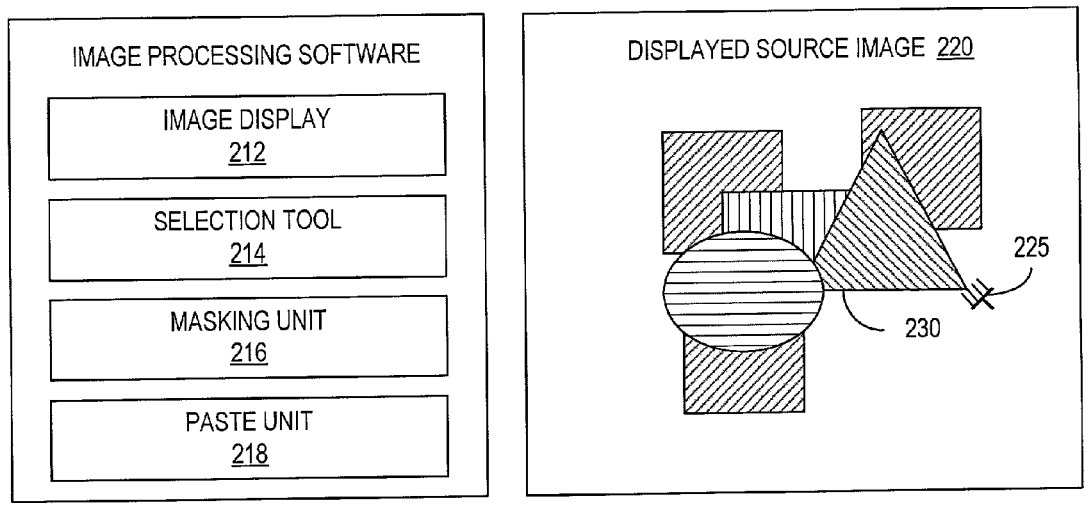
FIG. 2A is a block diagram of an image processing system in accordance with an embodiment of the invention.

For a smart selection and masking process in accordance with an embodiment of the invention, image processing system or software package 200 displays a source image 220 such as illustrated in FIG. 2A. System 200 includes software objects or units that perform standard image processing such as file management and conventional image processing functions that are well known in the art. As illustrated in FIG. 2A, system 200 includes software units 212, 214, 216, and 218 implementing image display, object selection, masking, and paste operations, respectively.

For smart selection, copy/cut, and masking operations in system 200, a user uses selection tool 214 that is among the image processing tools that the image processing software provides. In accordance with an aspect of the invention, selection tool 214 provides a brush-type cursor 225 or another interface for marking a swath that defines an edge area having a non-zero width. The swath can have a user-selected width or a predefined width such as 10 pixel, but the width of the edge area generally depends on the size and resolution of the image or object being selected.

In an alternative embodiment of selection tool 214, a user marks a thin boundary line (e.g., logically a boundary with zero width), and masking unit 216 or other image processing software defines an edge area to include portions of the image (e.g., pixels) within a specific distance of the user-selected boundary.

Figure 2B:
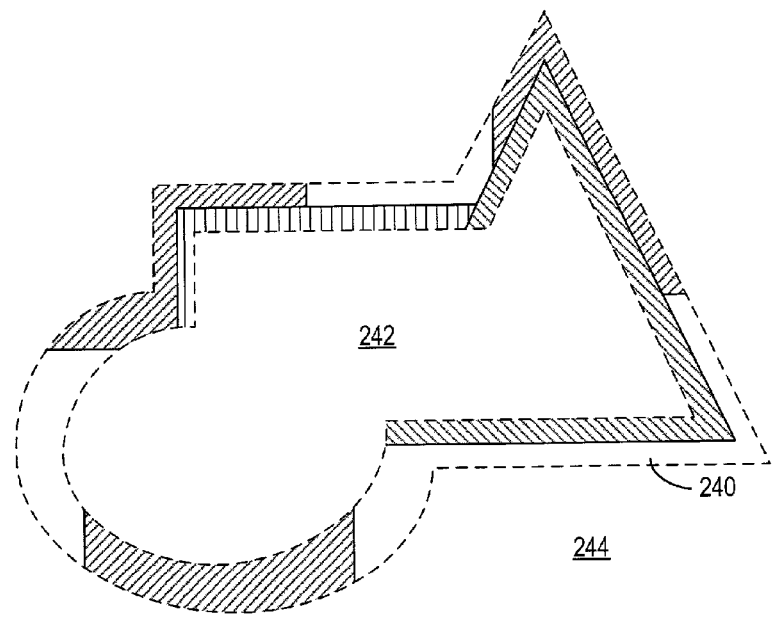
FIG. 2B shows an edge area for selecting a portion of the source image for copy/cut, mask, and paste operations in accordance with an embodiment of the invention.

In either case, the user uses selection tool 214 to designate an outline roughly following the edge of a foreground object 230, and the outline defines an edge area 240 such as illustrated in FIG. 2B. Pixels in an interior area 242, which is inside edge area 240, can be presumed to have the natural foreground color of the selected foreground object. Pixels in an exterior area 244 outside edge area 240 are presumed to have boundary colors, which are not part of the selected foreground object. Pixels in edge area 240 can have the natural foreground color, the background color, or a combination foreground and background colors.

Figure 3:
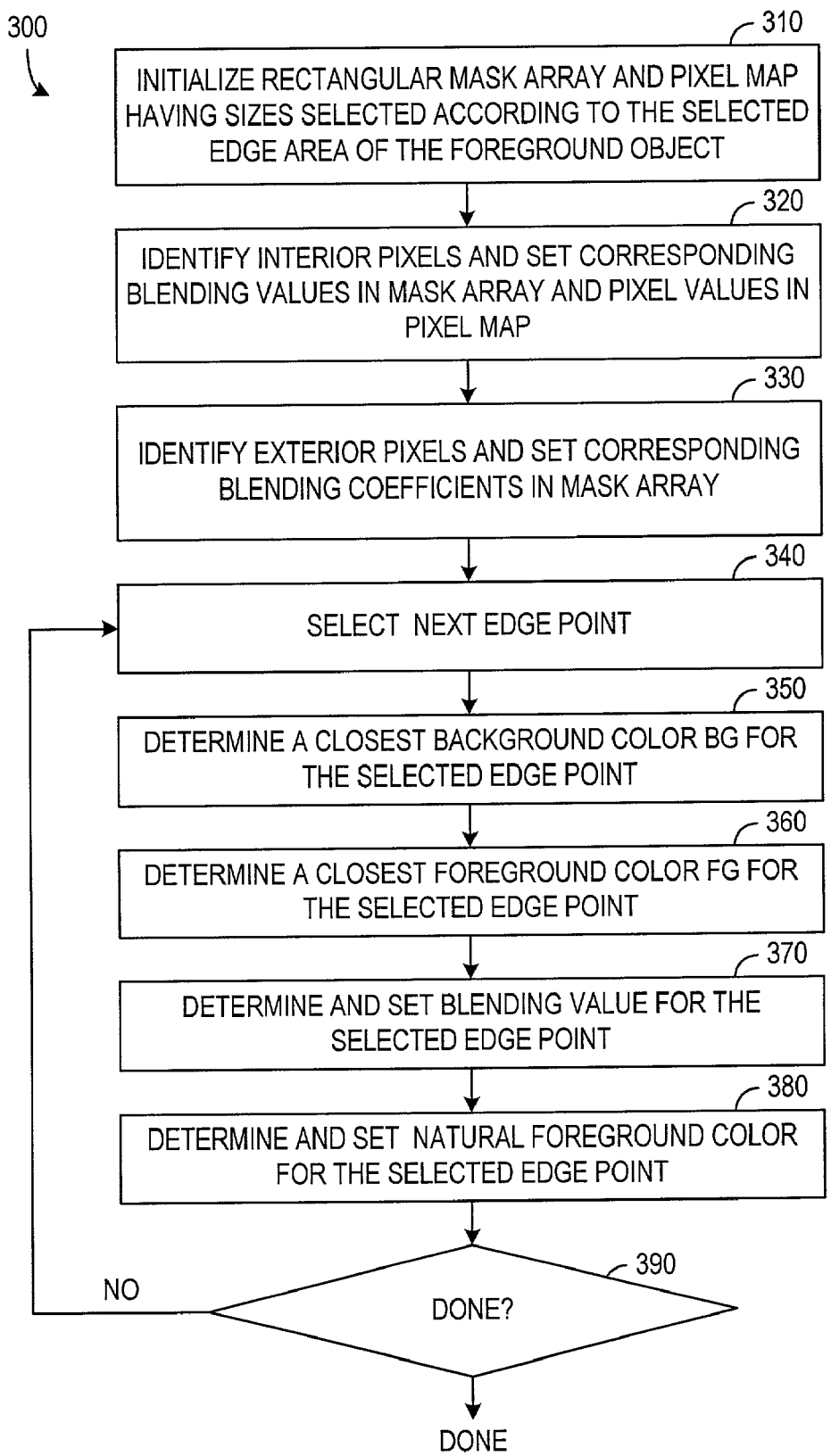
FIG. 3 is a flow diagram of a selection and masking process in accordance with an embodiment of the invention.

FIG. 3 is a flow diagram of an exemplary process 300 for masking foreground object 230 after edge area 240 has been established. In an initial step 310, a rectangular mask array is allocated for blending coefficients, and a pixel map is allocated for pixel values representing the foreground object. The mask array contains rows and columns of blending parameters and has a size corresponding to a block of pixels in source image 200 that contains edge area 240, interior area 242, and generally a portion of exterior area 244.

The mask array is initialized so that each blending parameter has a dummy value. In an exemplary embodiment of the invention, the blending parameters are unsigned 8-bit values, and the dummy value is 127. However, the number of bits in each blending parameter and the dummy value can be changed as desired in alternative embodiments of the invention.

The pixel map can be initialized to contain corresponding pixel values from the source image, but generally, only pixels corresponding to interior area 242 necessarily retain the colors from the source image.

Step 320 identifies interior area 242, using a conventional method for identifying the interior of a boundary, which edge area 240 marks. In the mask array, each blending parameter corresponding to a pixel in interior area 212 is set to a value representing the foreground ground color is used without blending. In the exemplary embodiment of the invention, the value 0 for a blending parameter indicates the foreground color from the source image is used without blending with a background color.

Step 330 similarly identifies exterior area 244 and sets each blending parameter corresponding to the exterior area to a value (e.g., 255) indicating the background color of a target image is used without blending in exterior area 244.

Step 340 selects an edge point, which corresponds to a pixel in edge area 240. The selected edge point is an edge point for which a blending parameter has not been calculated. In the exemplary embodiment of the invention, searching the mask array for the dummy value will identify a blending parameter that corresponds to the edge area and has not been calculated.

Once an edge point is selected, steps 350 and 360 respectively determine the closest background and foreground colors for the selected edge point. One technique for determining the closest background colors for the edge point uses a set of expanding blocks of pixels as illustrated in FIG. 4.

Figure 4:
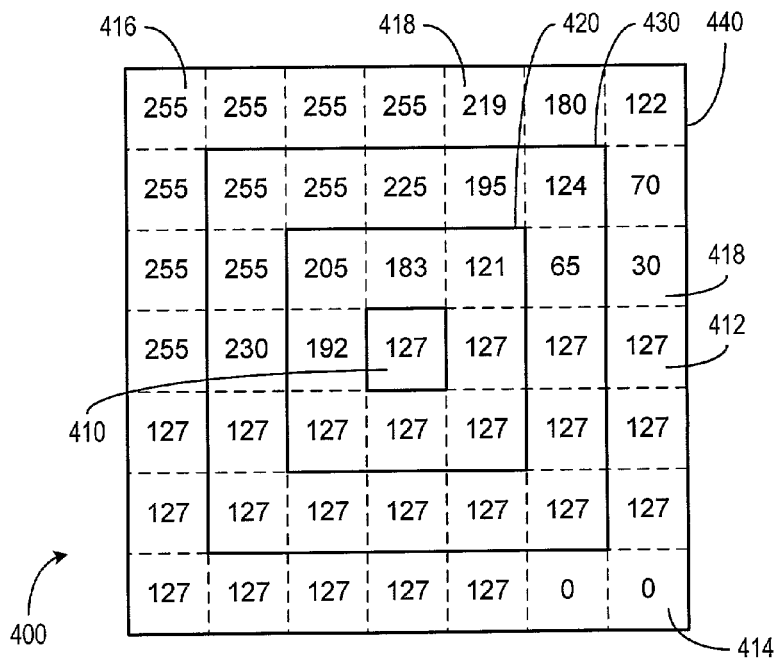
FIG. 4 illustrates a block of blending parameters and a process for determining closest foreground and background colors for a point in an edge area.

FIG. 4 shows a block of blending parameters centered on a blending parameter 410 associated with the selected edge point. In FIG. 4, the selected edge point has a bending value 410 equal to the dummy value 127, which indicates that a blending parameter has not been calculated for the selected edge point. The selected edge point can be found, for example, by top-down, left-to-right search of the mask array for a pixel having a blending parameter equal to the dummy value.

A nested series of blocks 420, 430, and 440 that are centered on the selected edge point contains blending parameters indicating properties of pixels near the selected edge point. In particular, a blending parameter 412, which has the dummy value, indicates the corresponding pixel is in the edge area and does not have a calculated blending parameter. Blending parameters 414 and 416 have values 0 and 255 indicating respective pixels have the foreground color and the background color, respectively. Blending parameters 418, which are in the range 1 to 126 or 128 to 254, indicate corresponding pixels are in the edge area and have calculated blending parameters.

One method for determining a closest background color BG for the selected edge point is to determine an average of the pixel values for pixels having a blending parameter (e.g., value 255) indicating the pixel has the background color in the source image. The average can be weighted so that pixels closest to the selected edge point (e.g., in block 420) provide the greatest contributions to the average, while pixels farther from the selected edge point provide smaller contributions.

Alternatively the closest background color BG for the selected edge point can be determined from previously determined background colors found for other edge points. For example, in FIG. 4, block 420 contains several blending parameters in the range 1 to 126 or 128 to 254 indicating pixels in the edge area having closest background colors that were previously determined. Averaging those previously determined closest background colors may require less processing time than the average of the colors of the background pixels in a larger block 440 of pixels.

A closest foreground color FG can be determined in a similar fashion from an average of the colors of the pixels having a blending parameter (e.g., value 0) identifying pixels that have natural foreground color or from previously determined closest foreground colors of nearby pixels in the edge area.

Returning to FIG. 3, once the closest background color BG and the closest foreground color FG are known, a blending parameter B can be determined for the selected edge point in step 370 by finding a linear combination of the closest background color BG and the closest foreground FG having a minimum distance in color space from the color SC of the selected pixel in the source images. For example, blending parameter B is selected to minimize a color space distance $\Delta$ of Equation 1, which shows color space distance $\Delta$ in terms of the red, blue, and green components of the color vectors SC, BG, and FG $$\Delta^2 = (SCr-((B/255)*BGr+(1-(B/255))*FGr))^2 + (SCb-((B/255)*BGb+(1-(B/255))*FGb))^2 + (SCg-((B/255)*BGg+(1-(B/255))*FGg))^2 \quad \text{Equation 1:}$$

To reduce the required processing time or if the minimum color space distance $\Delta$ is too large for a selected edge point, interpolation of blending parameters found for nearby pixels in the edge area can determine the blending parameter B for the selected edge point.

The determined blending parameter B is inserted into the appropriate location in the masking array. However, if the calculated blending parameter B happens to have the dummy value (e.g., 127), the blending parameter is altered slightly (e.g., changed to 126) before changing the mask array.

Once a blending parameter B is known for a pixel, a natural foreground color NFG for the pixel is determined in step 380. Equation 2 indicates an exemplary formula for the natural foreground color NFG given the source color SC, the background color BG, and the blending parameter B.

$$i\ NFG = SC - B*BG \quad \text{Equation 2:}$$

The natural foreground color for the edge pixel is inserted at the appropriate location in the pixel map representing the foreground object.

Process 300 repeats steps 340 to 380 for each point in the edge area to finish construction of the mask array and the pixel map for the foreground object. A paste operation in accordance with the invention can then use the mask array and the pixel map to paste the foreground object into a target image.

Figure 5:
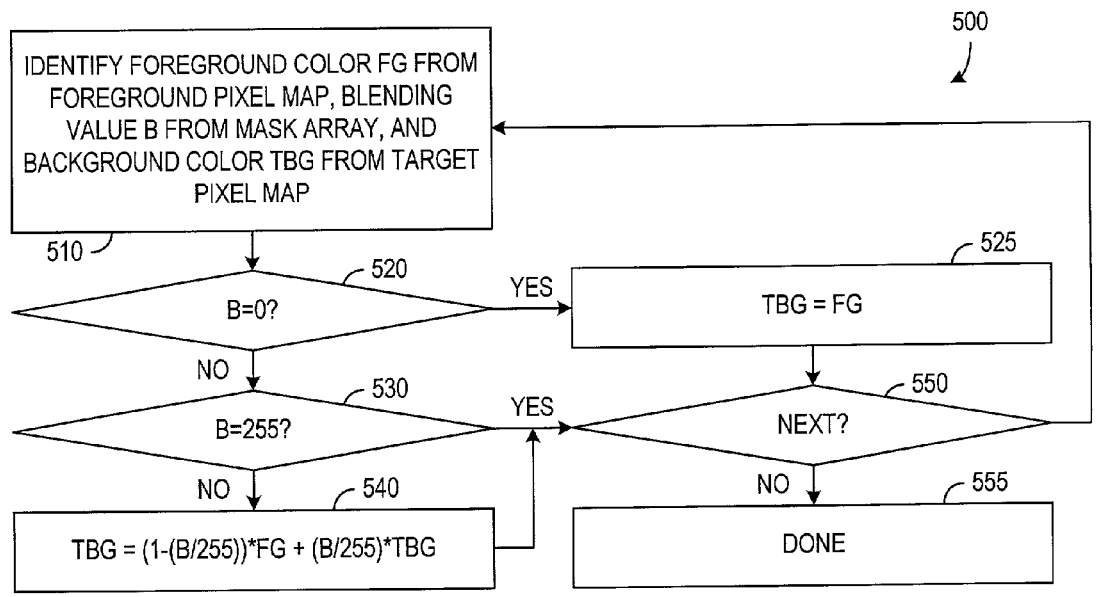
FIG. 5 is a flow diagram for a paste operation in accordance with an embodiment of the invention.

FIG. 5 is a flow diagram of a paste operation 500 in accordance with an exemplary embodiment of the invention. Paste operation 500 starts in step 510 by identifying a foreground color FG for a pixel in the pixel map of the foreground object, and a corresponding blending parameter B from the mask array. For the paste operation, the pixel from the foreground pixel map has a corresponding a pixel in a target pixel map, where the correspondence depends on where the foreground object will be pasted in the target image. The corresponding pixel in the target pixel map representing the target image has a color TBG.

Step 520 determines whether the identified blending parameter B has the value (e.g., 0) corresponding to interior foreground pixels. If so, step 525 changes the color TBG of the pixel in the target pixel map to foreground color FG. If not, process 500 moves from step 520 to step 530.

Step 530 determines whether the identified blending parameter B has the value (e.g., 255) corresponding to exterior background pixels. If so, the color TBG of the pixel in the target pixel map is not changed. If not, process 500 moves from step 530 to step 540.

Step 540 determines a new target pixel color using foreground color FG, blending parameter B, and existing target pixel color TBG. Equation 3 indicates an exemplary formula for determination of the new target pixel color.

$$TBG = (1-(B/255))*FG + (B/255)*TBG \quad \text{Equation 3:}$$

After step 525, 530, or 540, process 500 in step 550 determines whether any pixel values from the foreground pixel map remain to be pasted into the target pixel map. If further pixels remain, process 500 jumps from step 550 back to step 510 and repeats the above-described operations for the next pixel in the foreground object. Otherwise, paste operation 500 is complete.

In accordance with aspects of the invention described herein can provide a selection tool simplifies selection of complicated objects by providing a wide selection brush or another user interface for designating a wide edge area that is likely to contain the desired edge of a foreground object.

In accordance with another aspect of the invention, masking and pasting operations improve the appearance of composite images. In particular, the masking operation creates a mask that identifies points or pixels having colors or characteristics of the foreground object, the background, or a combination of the foreground and background. The paste operation can thus add the foreground object to a target image without omitting portions of the foreground object or adding stray portions of the background from the source image.

Additionally, in composite images, unnatural shading that originated in the background of the source image is replaced with appropriate shading from the target image, and the paste operation can provide natural-looking composite images even when the foreground object includes complicated features such as burred edges, hair, smoke, water, glass, and shadow.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. An image manipulation process comprising:
   designating an edge area containing a boundary of an object in a source image, the edge area having a non-zero width; and
   constructing a mask containing a data element for each portion of the edge area, each data element indicating whether the corresponding portion has a corresponding foreground color from the object, a corresponding background color from a background surrounding the object, or a combination color resulting from a combination of the corresponding foreground color and the corresponding background color, wherein each data element comprises a blending parameter, wherein:
   a first value of the blending parameter indicates the corresponding portion has the corresponding foreground color;
   a second value of the blending parameter indicates the corresponding portion has the corresponding background color; and
   a range of values of the blending parameter indicate proportions of the corresponding foreground and background colors in the combination color.

2. The process of claim 1, further comprising:
   for each portion of the edge area having a combination color, determining a natural foreground color resulting from removing from the combination color a contribution associated with the corresponding background color; and
   constructing a first pixel map representing the object, wherein the pixel map contains pixel values representing the natural foreground color of corresponding portions of the object.

3. The process of claim 2, further comprising pasting the object in a second pixel map representing a target image, wherein pasting comprises:
   identifying a target pixel in the second map that corresponds to a source pixel in the object; and
   changing a first color of the target pixel to a new color determined from the first color, a second color associated with the source pixel, and a blending parameter associated with the source pixel.

4. The process of claim 3, wherein the new color is a linear combination of the first and second colors.

5. An image manipulation process comprising:
   designating an edge area containing a boundary of an object in a source image, the edge area having a non-zero width;
   constructing a mask containing a data element for each portion of the edge area, each data element indicating whether the corresponding portion has a corresponding foreground color from the object, a corresponding background color from a background surrounding the object, or a combination color resulting from a combination of the corresponding foreground color and the corresponding background color;
   for each portion of the edge area having a combination color, determining a natural foreground color resulting from removing from the combination color a contribution associated with the corresponding background color; and
   constructing a pixel map representing the object, wherein the pixel map contains pixel values representing the natural foreground color of corresponding portions of the object.

6. The process of claim 5, further comprising pasting the object in a second pixel map representing a target image, wherein pasting comprises:
   identifying a target pixel in the second map that corresponds to a source pixel in the object; and
   changing a first color of the target pixel to a new color determined from the first color, a second color associated with the source pixel, and a blending parameter associated with the source pixel.

7. The process of claim 6, wherein the new color is a linear combination of the first and second colors.

* * * * *